Patented Nov. 19, 1935

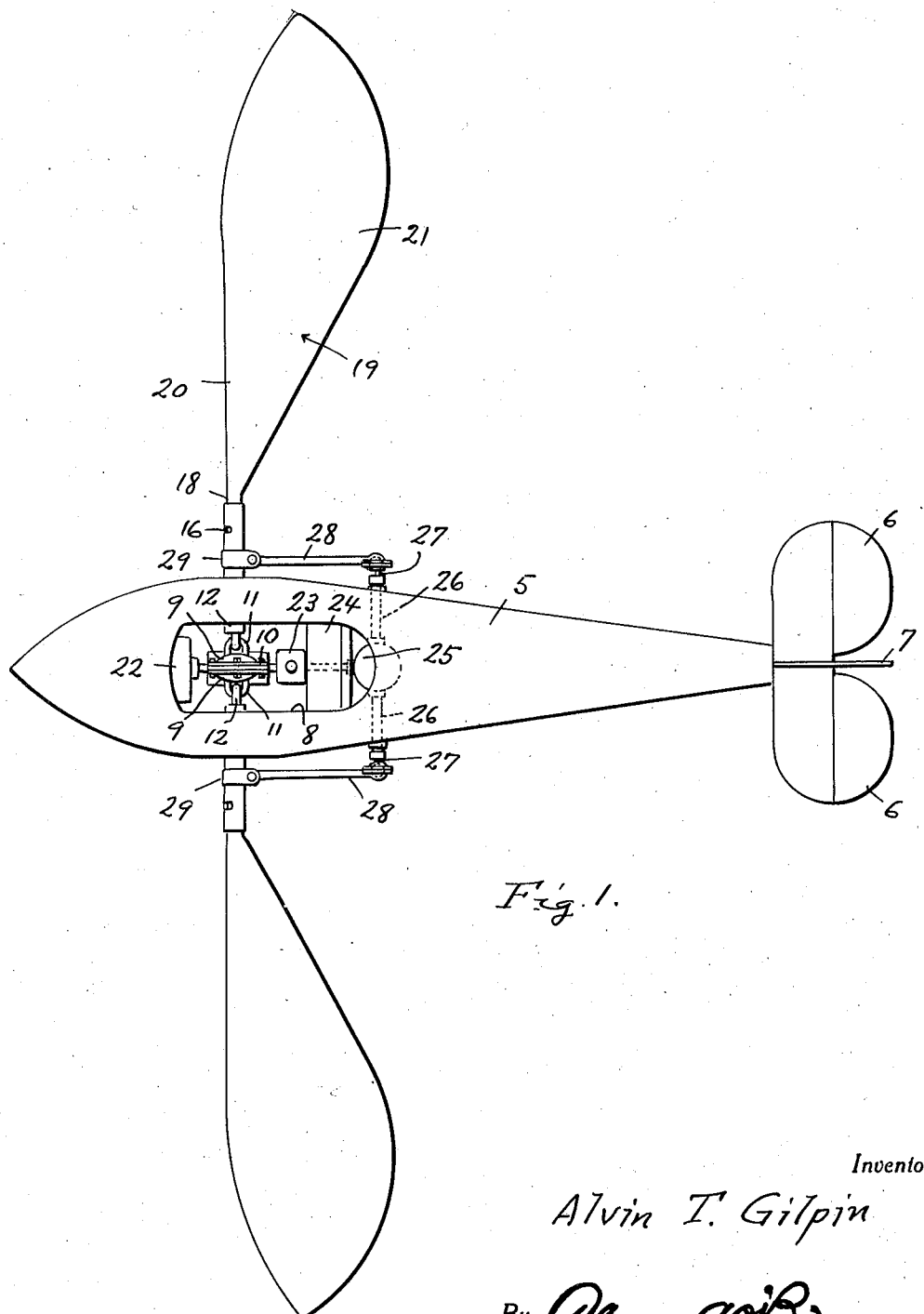

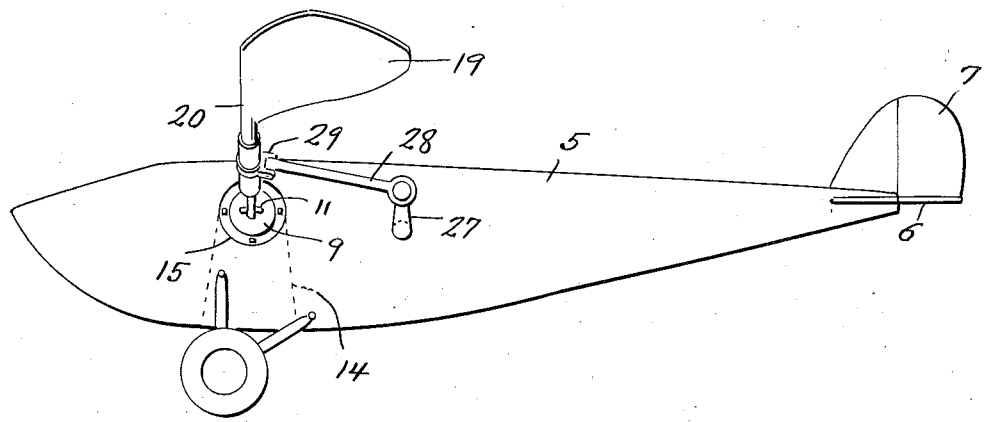
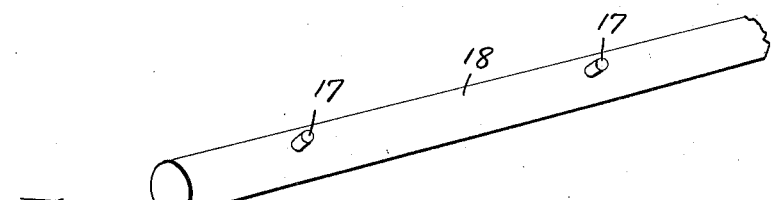

2,021,627

UNITED STATES PATENT OFFICE 2,021,627

AIRCRAFT

Alvin T. Gilpin, Liberty, Ky.

Application May 13, 1935, Serial No. 21,261

3 Claims. (Cl. 244—11)

This invention appertains to new and useful improvements in aircrafts and more particularly to novel propulsion for aircrafts wherein movable wings are provided functioning as propulsion blades for driving the craft.

The principal object of the present invention is to provide propulsion means for aircrafts wherein lateral blades are provided which are swung in such a manner as to simulate the action of a bird in flight.

Another important object of the invention is to provide an aircraft employing mobile wings serving as propulsion blades which when maintained stationary will serve to permit gliding of the ship.

These and various other important objects and advantages of the invention will become apparent during the reading of the following specification.

In the drawings:—

Figure 1 represents a top plan view of the novel aircraft.

Figure 2 represents a side elevational view of the aircraft.

Figure 3 represents a fragmentary side elevational view of one of the swingable barrels with a wing shank engaged into the same.

Figure 4 represents a perspective view of one end of one of the blades.

Figure 5:
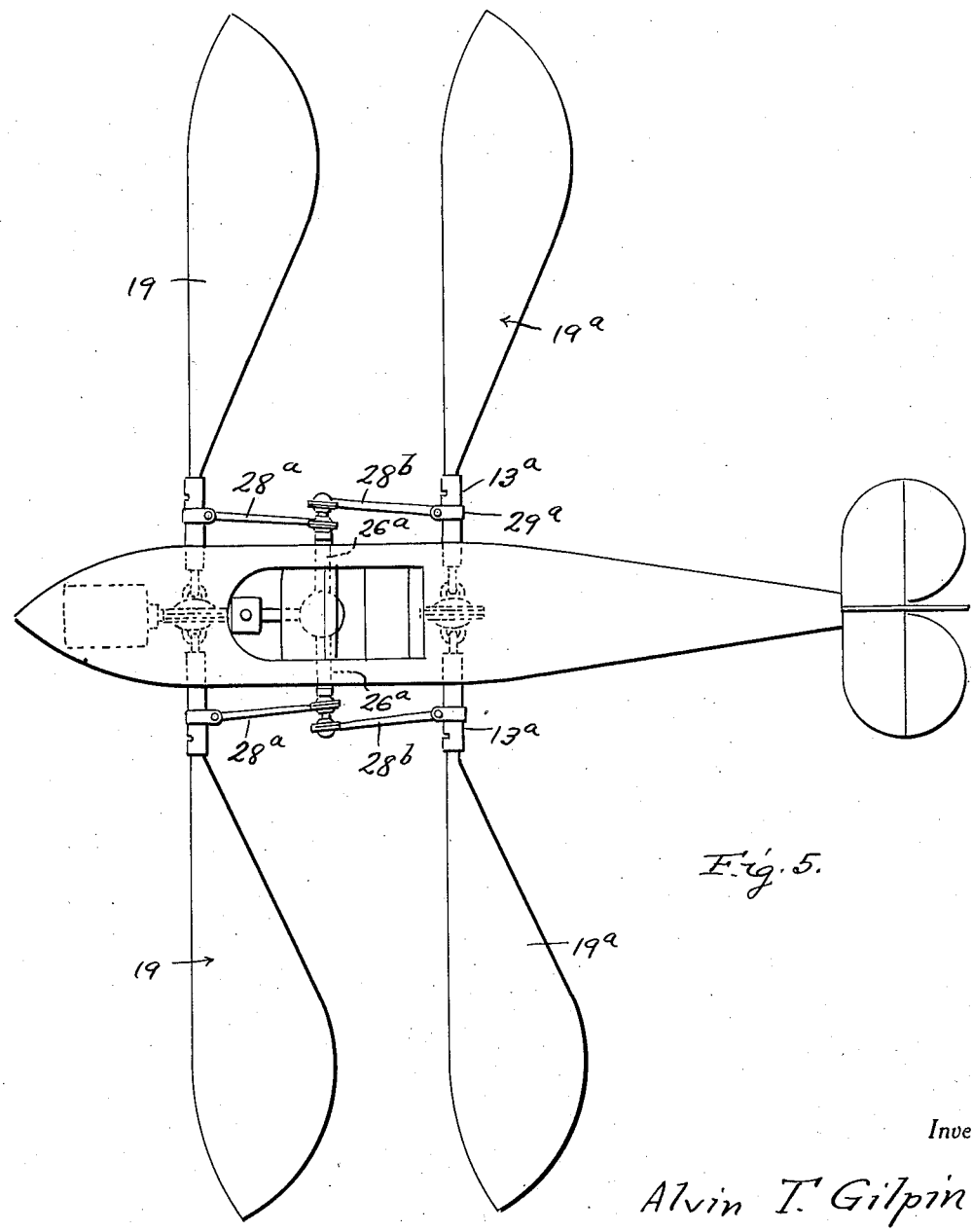
Figure 5 represents a top plan view of a dual type of aircraft constructed in conformity with the present invention.

Referring to the drawings wherein like numerals designate like parts, it can be seen that numeral 5 represents the fuselage having the elevators 6 and the rudder 7 at its rear end. The numeral 8 represents the cock-pit wherein a pair of flanged concavo-convex shaped plates 9—9 are secured together by bolts 10 and they are flanged with their concaved sides together. The contact sides of these plates are provided with eye members 11 with which the eye members 12 on the inner ends of the swingable barrels 13 are connected.

As is suggested in Figure 2 by dotted lines the plates 9—9 are mounted upon a suitable post 14.

Each of the barrels 13 extends through a circular opening 15 in one side of the fuselage and has a pair of circumferentially extending and longitudinally spaced slots 16 therein through which the lateral pins 17—17 on the shank 18 of a corresponding blade or wing structure 19.

Each wing structure consists of the rib or shoulder portion 20 which is a continuation of the shank 18 into the wing, and the trailing fin pointer 21.

The numeral 22 represents a motor which drives through the clutch 23 and transmission 24 to the differential 25, laterally of which extends the gas sections 26—26. Each being provided with a crank 27 at its outer end thru which a connecting rod 28 extends. Each connecting rod 28 connects the clamp 29 on the intermediate portion of the barrels 13.

A slightly modified form of the invention is shown in Figure 5, wherein each of the shafts 26a is provided not only with a crank for the connecting rods 28a—28a but each with an additional crank to accommodate a rearwardly extending connecting rod 28b which connects to the clamp 29a on the barrel 13a which receive the shanks of the rear blades or wing structure 19a. This is the dual type of aircraft. Otherwise than this dual type the ship is constructed the same as in the preferred form shown in Figures 1 and 2.

While the foregoing specification sets forth the invention in specific terms, it is to be understood that numerous changes in the shape, size and materials may be resorted to without departing from the spirit and scope of the invention as claimed hereinafter.

What is claimed is:—

1. An aircraft, a fuselage provided with an opening in each side thereof, a standard in the fuselage provided with an eye member on each side thereof, a pair of socket members, each socket member being provided with an eye at one end for engaging a corresponding eye on the standard, blade members extending laterally of the fuselage and each provided with a shank for engagement to a corresponding socket member, a motor, a drive from the motor, a crank shaft driven by the drive and connecting rods from the said socket members to the said crankshaft.

2. An aircraft, a fuselage provided with an opening in each side thereof, a standard in the fuselage provided with an eye member on each side thereof, a pair of socket members, each socket member being provided with an eye at one end for engaging a corresponding eye on the standard, blade members extending laterally of the fuselage and each provided with a shank for engagement to a corresponding socket member, a motor, a drive from the motor, a crankshaft driven by the drive and connecting rods from the said socket members to the said crankshaft, the shanks and socket members being connected in swivelled relation by a pin and slot connection.

3. An aircraft, a fuselage provided with an opening in each side thereof, a standard in the fuselage provided with an eye member on each side thereof, a pair of socket members, each socket member being provided with an eye at one end for engaging a corresponding eye on the standard, blade members extending laterally of the fuselage and each provided with a shank for engagement to a corresponding socket member, a motor, a drive from the motor, a crank shaft driven by the drive and connecting rods from the said socket members to the said crankshaft, a complementary set of blades about midship of the fuselage, each of said blades being connected to the crankshaft by a connecting rod.

ALVIN T. GILPIN.